United States Patent
Shimoyama et al.

(10) Patent No.: US 10,843,481 B2
(45) Date of Patent: Nov. 24, 2020

(54) LIQUID EJECTION APPARATUS

(71) Applicant: CANON KABUSHIKI KAISHA, Tokyo (JP)

(72) Inventors: Noboru Shimoyama, Yokohama (JP); Atsushi Kohnotoh, Kawasaki (JP); Ryoma Arai, Kawasaki (JP); Tsuyoshi Saeki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/361,301

(22) Filed: Mar. 22, 2019

(65) Prior Publication Data

US 2019/0299649 A1    Oct. 3, 2019

(30) Foreign Application Priority Data

Mar. 30, 2018   (JP) ................. 2018-068369

(51) Int. Cl.
| | | |
|---|---|---|
| B41J 2/175 | (2006.01) | |
| B41J 2/045 | (2006.01) | |
| B41J 2/18 | (2006.01) | |
| G01M 3/16 | (2006.01) | |

(52) U.S. Cl.
CPC ....... B41J 2/17596 (2013.01); B41J 2/04501 (2013.01); B41J 2/17513 (2013.01); B41J 2/18 (2013.01); G01M 3/16 (2013.01)

(58) Field of Classification Search
CPC .... B41J 2/04501; B41J 2/175; B41J 2/17513; B41J 2/17596; B41J 2/18; B41J 29/02; B41J 29/13; G01M 3/16
See application file for complete search history.

(56) References Cited

U.S. PATENT DOCUMENTS

| | | | |
|---|---|---|---|
| 5,506,611 A * | 4/1996 | Ujita | B41J 2/17503 347/86 |
| 5,657,057 A | 8/1997 | Nakajima et al. | 347/7 |
| 5,801,736 A * | 9/1998 | Ikkatai | B41J 2/16523 347/86 |
| 6,402,277 B1 * | 6/2002 | Monclus | B41J 2/175 347/7 |
| 9,682,564 B2 | 6/2017 | Saeki et al. | B41J 2/17513 |
| 9,751,318 B2 | 9/2017 | Iwano et al. | B41J 2/17523 |
| 2005/0206691 A1 * | 9/2005 | Takata | B41J 2/175 347/84 |
| 2017/0197407 A1 | 7/2017 | Karita et al. | B41J 2/04535 |
| 2017/0326882 A1 | 11/2017 | Okude et al. | B41J 2/01 |
| 2019/0009557 A1 | 1/2019 | Arai et al. | B41J 2/17596 |
| 2019/0009561 A1 | 1/2019 | Mukoyama et al. | B41J 2/21 |
| 2019/0009562 A1 | 1/2019 | Abe et al. | B41J 2/16505 |
| 2019/0009563 A1 | 1/2019 | Tokisawa et al. | B41J 2/17596 |

FOREIGN PATENT DOCUMENTS

JP   2017-121788   7/2017

OTHER PUBLICATIONS

U.S. Appl. No. 16/288,729, filed Feb. 28, 2019.
U.S. Appl. No. 16/360,400, filed Mar. 21, 2019.

* cited by examiner

Primary Examiner — Anh T Vo
(74) Attorney, Agent, or Firm — Venable LLP

(57) ABSTRACT

A liquid ejection apparatus capable of detecting ink leakage early is provided. For this purpose, an ink leakage detection pin and a wall capable of storing leaked ink are provided at a joint part which is the part connecting the print head and the ink supply unit.

17 Claims, 17 Drawing Sheets

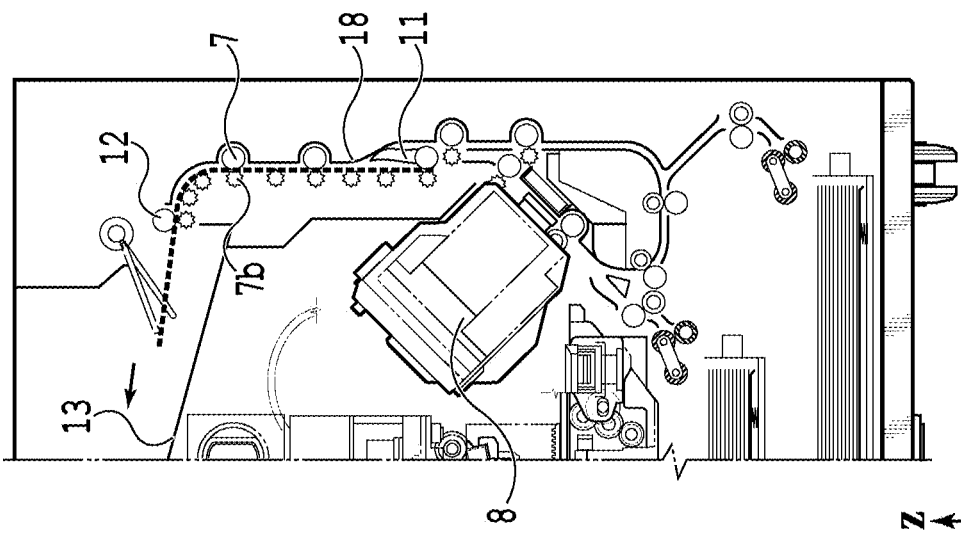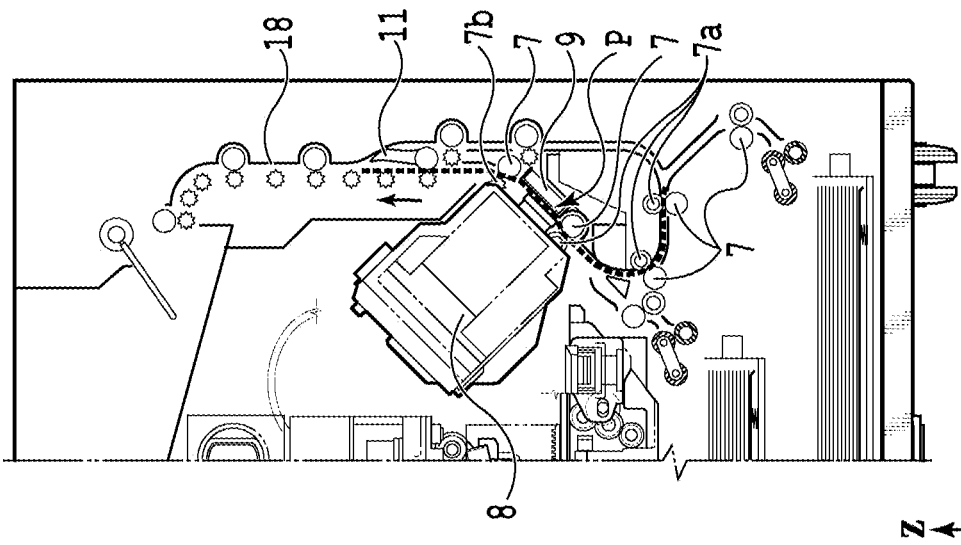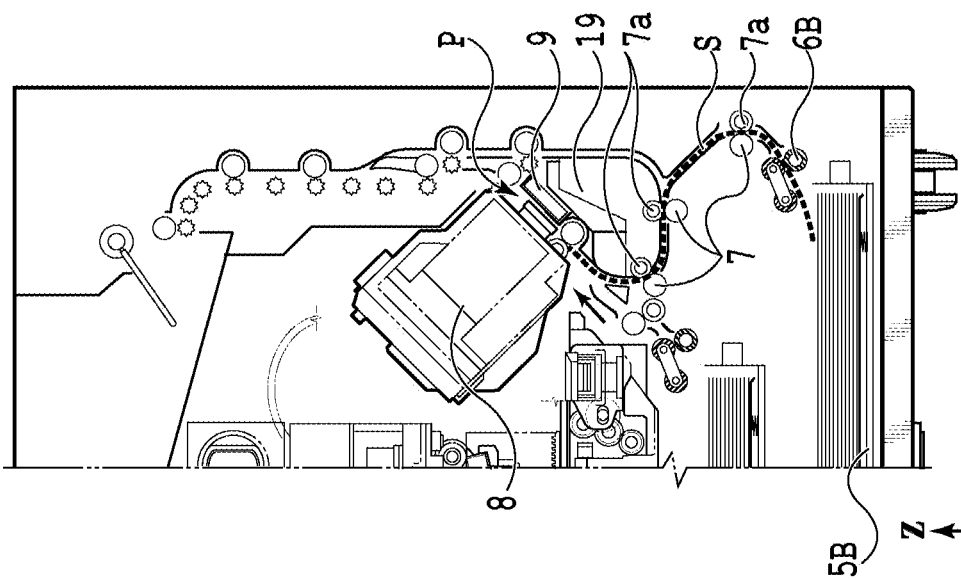

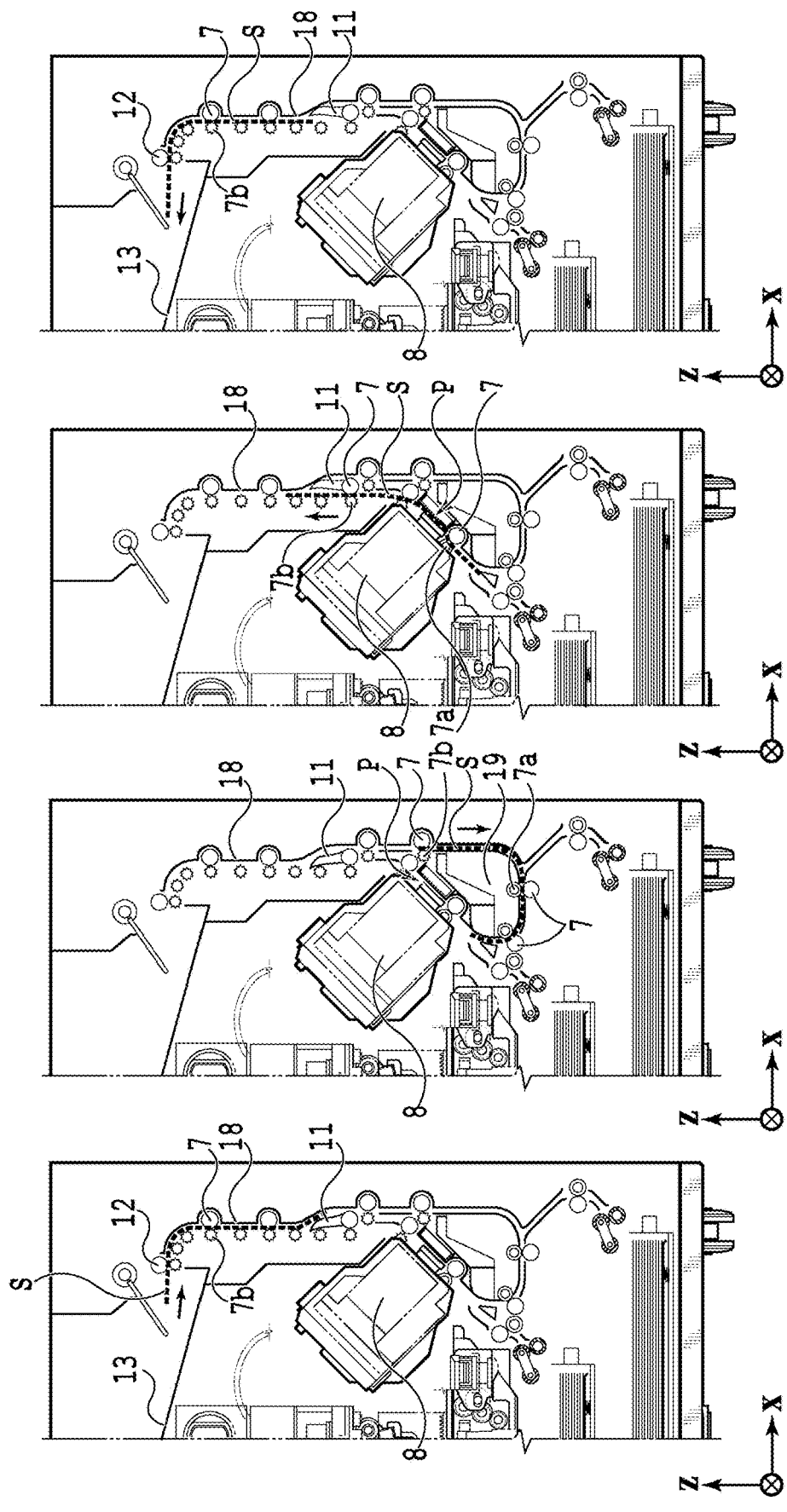

LIQUID EJECTION APPARATUS

BACKGROUND OF THE INVENTION

Field of the Invention

The present invention relates to a liquid ejection apparatus configured to pressurizes ejection heads for ejecting liquid to supply liquid.

Description of the Related Art

Japanese Patent Laid-Open No. 2017-121788 has described therein pressurized supply using a pump to supply ink from an ink tank to a print head. In the case of a supply system adopting pressurized supply as described in Japanese Patent Laid-Open No. 2017-121788, there is a risk that a large amount of ink may leak out in a short time in the case where leakage of ink has occurred at a connecting part in a supply flow path. Therefore, it is necessary to detect the leakage early in the case where leakage of ink has occurred.

SUMMARY OF THE INVENTION

The present invention therefore provides a liquid ejection apparatus capable of detecting leakage of ink early.

Therefore, a liquid ejection apparatus of the present invention comprising: an ejection head configured to eject liquid; a connecting unit connected to the ejection head and configured to supply liquid to the ejection head; a first pressurizing unit configured to pressurize liquid to be supplied to the ejection head via the connecting unit; a first detection unit capable of detecting liquid which has leaked at a connecting part between the connecting unit and the ejection head; and a wall having a predetermined height configured to surround the connecting part.

According to the present invention, it is possible to realize a liquid ejection apparatus capable of detecting leakage of ink early.

Further features of the present invention will become apparent from the following description of exemplary embodiments with reference to the attached drawings.

BRIEF DESCRIPTION OF THE DRAWINGS

FIG. 5A shows the conveying path in the case of feeding a print medium;

FIG. 5B shows the conveying path in the case of feeding a print medium;

FIG. 5C shows the conveying path in the case of feeding a print medium;

FIG. 6A shows the conveying path in the case of performing print operation;

FIG. 6B shows the conveying path in the case of performing print operation;

FIG. 6C shows the conveying path in the case of performing print operation;

FIG. 6D shows the conveying path in the case of performing print operation;

DESCRIPTION OF THE EMBODIMENTS

Figure 1:
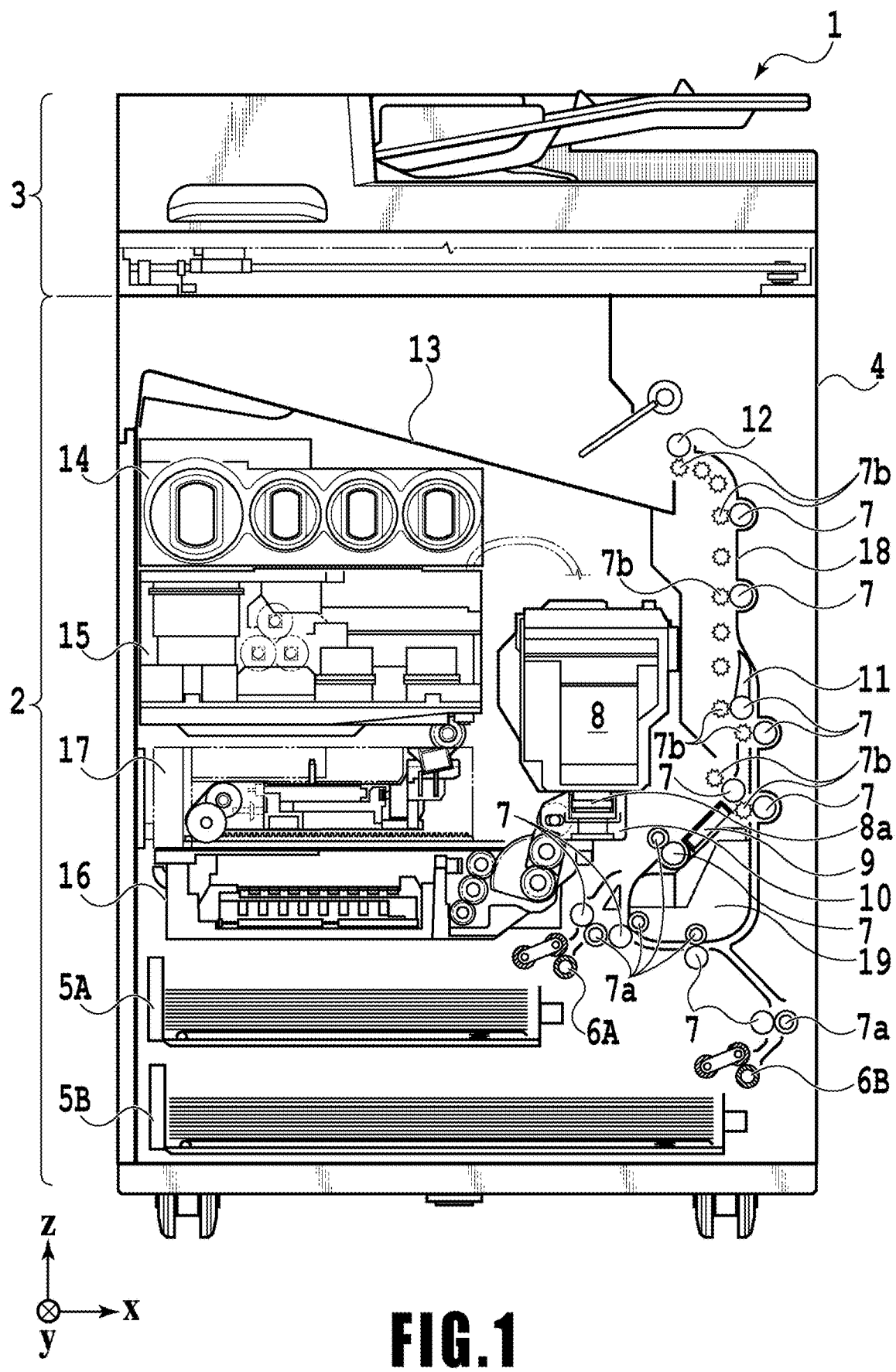
FIG. 1 shows an internal configuration of an ink-jet printing apparatus.

In the following, a first embodiment of the present invention will be described, referring to the drawings.

FIG. 1 is an internal configuration diagram of an inkjet printing apparatus 1 (hereinafter "printing apparatus 1") used in the present embodiment. In the drawings, an x-direction is a horizontal direction, a y-direction (a direction perpendicular to paper) is a direction in which ejection openings are arrayed in a print head 8 described later, and a z-direction is a vertical direction.

The printing apparatus 1 is a multifunction printer comprising a print unit 2 and a scanner unit 3. The printing apparatus 1 can use the print unit 2 and the scanner unit 3 separately or in synchronization to perform various processes related to print operation and scan operation. The scanner unit 3 comprises an automatic document feeder (ADF) and a flatbed scanner (FBS) and is capable of scanning a document automatically fed by the ADF as well as scanning a document placed by a user on a document plate of the FBS. The present embodiment is directed to the multifunction printer comprising both the print unit 2 and the scanner unit 3, but the scanner unit 3 may be omitted. FIG. 1 shows the printing apparatus 1 in a standby state in which neither print operation nor scan operation is performed.

In the print unit 2, a first cassette 5A and a second cassette 5B for housing printing medium (cut sheets) S are detachably provided at the bottom of a casing 4 in the vertical direction. Relatively small printing medium of up to A4 size are stacked and housed in the first cassette 5A and relatively large printing medium of up to A3 size are stacked and hosed in the second cassette 5B. A first feeding unit 6A for feeding housed printing medium one by one is provided near the first cassette 5A. Similarly, a second feeding unit 6B is provided near the second cassette 5B. In print operation, a print medium S is selectively fed from either one of the cassettes.

Conveying rollers 7, a discharging roller 12, pinch rollers 7a, spurs 7b, a guide 18, an inner guide 19, and a flapper 11 are conveying mechanisms for guiding a print medium S in a predetermined direction. The conveying rollers 7 are drive rollers located upstream and downstream of the print head 8 (platen 9) and driven by a conveying motor (not shown). The pinch rollers 7a are follower rollers that are turned while nipping a print medium S together with the conveying rollers 7. The discharging roller 12 is a drive roller located downstream of the conveying rollers 7 and driven by the discharging motor. The spurs 7b nip and convey a print medium S together with the conveying rollers 7 and discharging roller 12 located downstream of the print head 8 (platen 9).

The printing apparatus 1 has multiple motors for driving the above drive rollers, and each drive roller is connected to one of the motors. The relationship between the motors and the drive roller will be described later in detail.

The guide 18 is provided in a conveying path of a print medium S to guide the print medium S in a predetermined direction. The inner guide 19 is a member extending in the y-direction. The inner guide 19 has a curved side surface and guides a print medium S along the side surface. The flapper 11 is a member for changing a direction in which a print medium S is conveyed in duplex print operation. A discharging tray 13 is a tray for stacking and housing printing medium S that were subjected to print operation and discharged by the discharging roller 12.

The print head 8 of the present embodiment is a full line type color inkjet print head. In the print head 8, a plurality of ejection openings configured to eject ink based on print data are arrayed in the y-direction in FIG. 1 so as to correspond to the width of a print medium S. That is, the print head is configured to eject inks of a plurality of colors. When the print head 8 is in a standby position, an ejection opening surface 8a of the print head 8 is oriented vertically downward and capped with a cap unit 10 as shown in FIG. 1. In print operation, the orientation of the print head 8 is changed by a print controller 202 described later such that the ejection opening surface 8a faces a platen 9. The platen 9 includes a flat plate extending in the y-direction and supports a print medium S being subjected to print operation by the print head 8 from the back side. The movement of the print head 8 from the standby position to a printing position will be described later in detail.

An ink tank unit 14 separately stores ink of four colors to be supplied to the print head 8. An ink supply unit 15 is provided in the midstream of a flow path connecting the ink tank unit 14 to the print head 8 to adjust the pressure and flow rate of ink in the print head 8 within a suitable range. The present embodiment adopts a circulation type ink supply system, where the ink supply unit 15 adjusts the pressure of ink supplied to the print head 8 and the flow rate of ink collected from the print head 8 within a suitable range.

A maintenance unit 16 comprises the cap unit 10 and a wiping unit 17 and activates them at predetermined timings to perform maintenance operation for the print head 8. The maintenance operation will be described later in detail.

Figure 2:
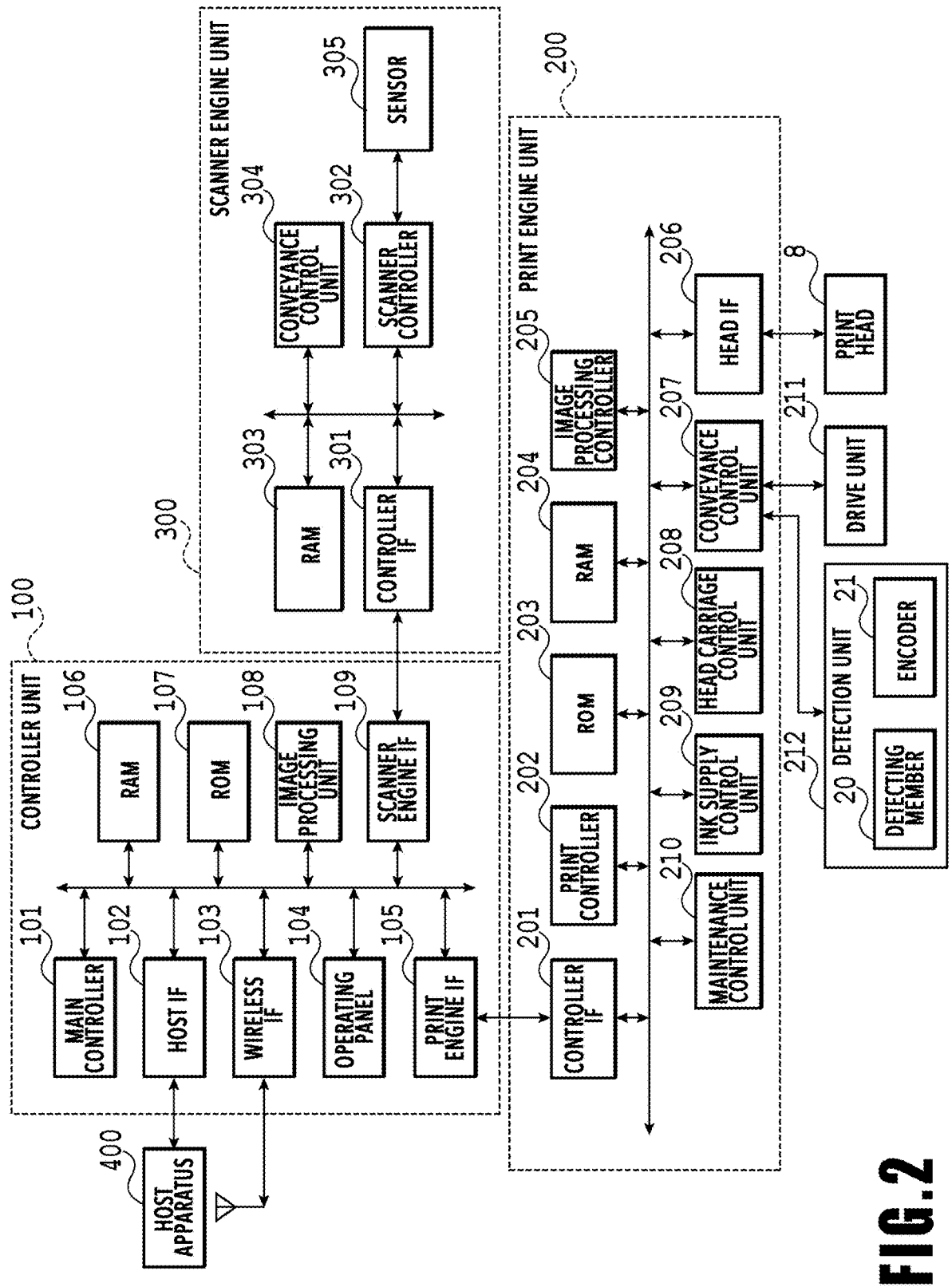
FIG. 2 is a block diagram showing a control configuration in the printing apparatus.

FIG. 2 is a block diagram showing a control configuration in the printing apparatus 1. The control configuration mainly includes a print engine unit 200 that exercises control over the print unit 2, a scanner engine unit 300 that exercises control over the scanner unit 3, and a controller unit 100 that exercises control over the entire printing apparatus 1. A print controller 202 controls various mechanisms of the print engine unit 200 under instructions from a main controller 101 of the controller unit 100. Various mechanisms of the scanner engine unit 300 are controlled by the main controller 101 of the controller unit 100. The control configuration will be described below in detail.

In the controller unit 100, the main controller 101 including a CPU controls the entire printing apparatus 1 using a RAM 106 as a work area in accordance with various parameters and programs stored in a ROM 107. For example, when a print job is input from a host apparatus 400 via a host I/F 102 or a wireless I/F 103, an image processing unit 108 executes predetermined image processing for received image data under instructions from the main controller 101. The main controller 101 transmits the image data subjected to the image processing to the print engine unit 200 via a print engine I/F 105.

The printing apparatus 1 may acquire image data from the host apparatus 400 via a wireless or wired communication or acquire image data from an external storage unit (such as a USB memory) connected to the printing apparatus 1. A communication system used for the wireless or wired communication is not limited. For example, as a communication system for the wireless communication, Wi-Fi (Wireless Fidelity; registered trademark) and Bluetooth (registered trademark) can be used. As a communication system for the wired communication, a USB (Universal Serial Bus) and the like can be used. For example, when a scan command is input from the host apparatus 400, the main controller 101 transmits the command to the scanner unit 3 via a scanner engine I/F 109.

An operating panel 104 is a mechanism to allow a user to do input and output for the printing apparatus 1. A user can give an instruction to perform operation such as copying and scanning, set a print mode, and recognize information about the printing apparatus 1 via the operating panel 104.

In the print engine unit 200, the print controller 202 including a CPU controls various mechanisms of the print unit 2 using a RAM 204 as a work area in accordance with various parameters and programs stored in a ROM 203. When various commands and image data are received via a controller I/F 201, the print controller 202 temporarily stores them in the RAM 204.

The print controller 202 allows an image processing controller 205 to convert the stored image data into print data such that the print head 8 can use it for print operation. After the generation of the print data, the print controller 202 allows the print head 8 to perform print operation based on the print data via a head I/F 206. At this time, the print controller 202 conveys a print medium S by driving the feeding units 6A and 6B, conveying rollers 7, discharging roller 12, and flapper 11 shown in FIG. 1 via a conveyance control unit 207. The print head 8 performs print operation in synchronization with the conveyance operation of the print medium S under instructions from the print controller 202, thereby performing printing.

The conveyance control unit 207, connected to the detection unit 212 for detecting the conveyance state of the printing medium S and the drive unit 211 for driving the drive rollers, controls the conveyance of the printing medium S using the drive unit 211, based on detection results obtained from the detection unit 212. The detection unit 212 has the detection members 20 for detecting the printing medium S and the encoders 21 for detecting the amount of rotation of the drive rollers.

Printing is performed in the course of the conveyance of the printing medium S by the conveyance control unit 207, by the print head 8 performing print operation under instructions from the print controller 202.

A head carriage control unit 208 changes the orientation and position of the print head 8 in accordance with an operating state of the printing apparatus 1 such as a maintenance state or a printing state. An ink supply control unit 209 controls the ink supply unit 15 such that the pressure of ink supplied to the print head 8 is within a suitable range. A maintenance control unit 210 controls the operation of the cap unit 10 and wiping unit 17 in the maintenance unit 16 when performing maintenance operation for the print head 8.

In the scanner engine unit 300, the main controller 101 controls hardware resources of the scanner controller 302 using the RAM 106 as a work area in accordance with various parameters and programs stored in the ROM 107, thereby controlling various mechanisms of the scanner unit 3.

For example, the main controller 101 controls hardware resources in the scanner controller 302 via a controller I/F 301 to cause a conveyance control unit 304 to convey a document placed by a user on the ADF and cause a sensor 305 to scan the document. The scanner controller 302 stores scanned image data in a RAM 303. The print controller 202 can convert the image data acquired as described above into print data to enable the print head 8 to perform print operation based on the image data scanned by the scanner controller 302.

Figure 3:
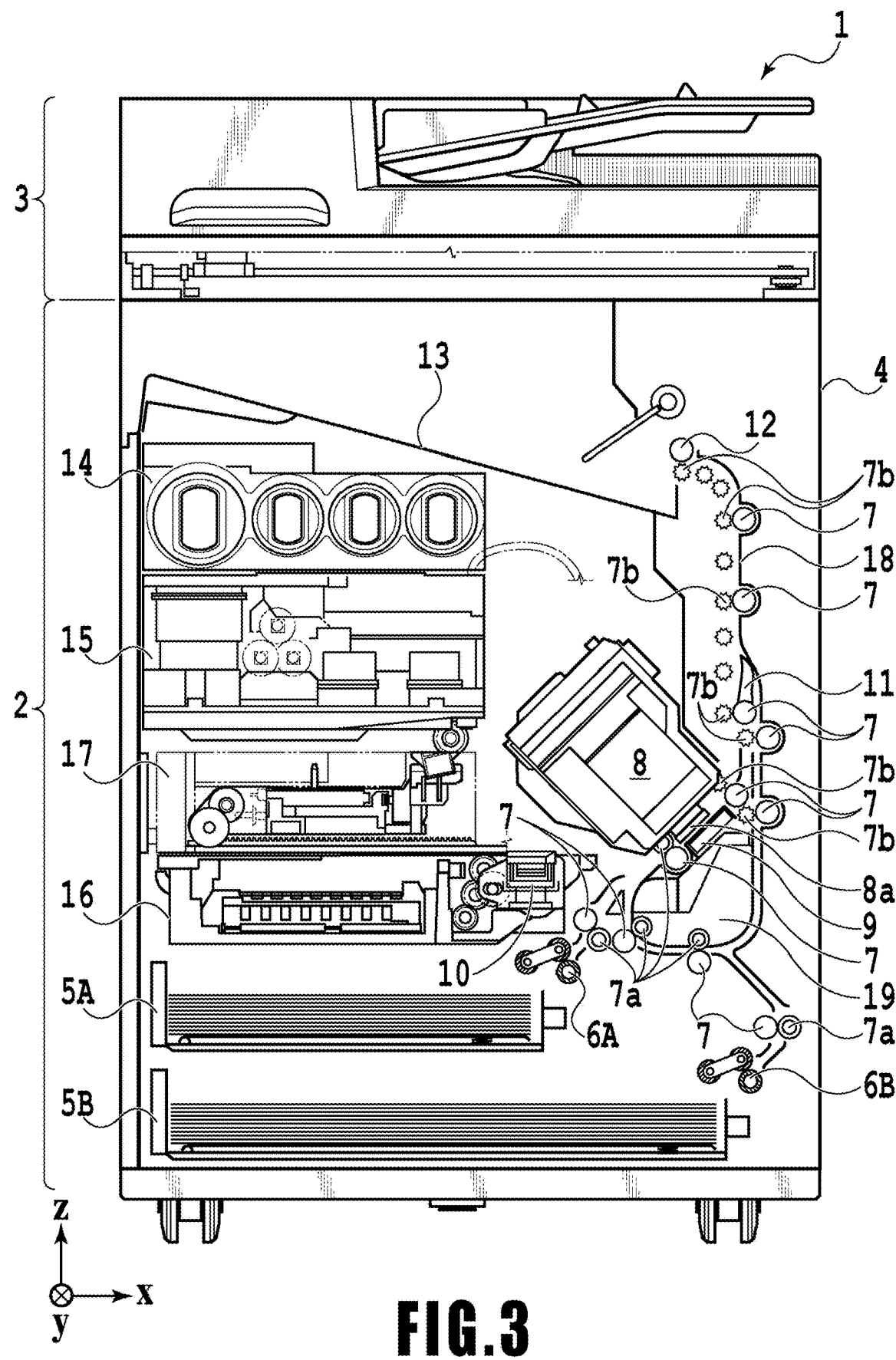
FIG. 3 shows the printing apparatus in a printing state.

FIG. 3 shows the printing apparatus 1 in a printing state. As compared with the standby state shown in FIG. 1, the cap unit 10 is separated from the ejection opening surface 8a of the print head 8 and the ejection opening surface 8a faces the platen 9. In the present embodiment, the plane of the platen 9 is inclined about 45° with respect to the horizontal plane. The ejection opening surface 8a of the print head 8 in a printing position is also inclined about 45° with respect to the horizontal plane so as to keep a constant distance from the platen 9.

In moving the print head 8 from the standby position shown in FIG. 1 to the printing position shown in FIG. 3, the print controller 202 uses the maintenance control unit 210 to move the cap unit 10 down to an evacuation position shown in FIG. 3, thereby separating the cap member from the ejection opening surface 8a of the print head 8. The print controller 202 then uses the head carriage control unit 208 to turn the print head 8 by 45° while adjusting the vertical height of the print head 8 such that the ejection opening surface 8a faces the platen 9. After the completion of print operation, the print controller 202 reverses the above procedure in moving the print head 8 from the printing position to the standby position.

Next, a conveying path of the print medium S in the print unit 2 will be described. Upon receipt of a print command, the print controller 202 first uses the maintenance control unit 210 and the head carriage control unit 208 to move the print head 8 to the printing position shown in FIG. 3. The print controller 202 then uses the conveyance control unit 207 to drive either the first feeding unit 6A or the second feeding unit 6B to feed the print medium S in accordance with the print command.

Figure 4C:
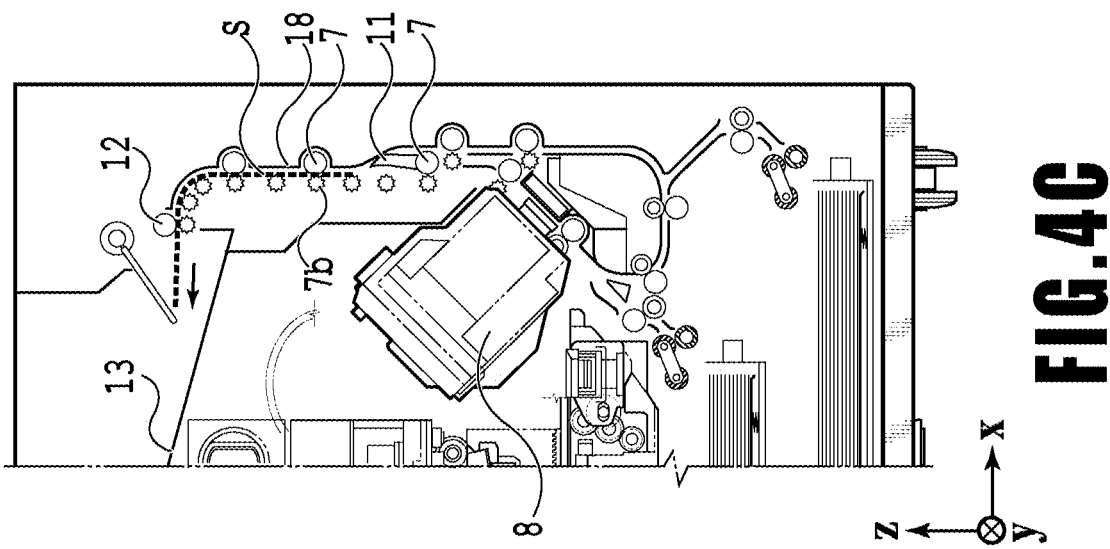
FIG. 4C shows the conveying path in the case of feeding a print medium.
Figure 4B:
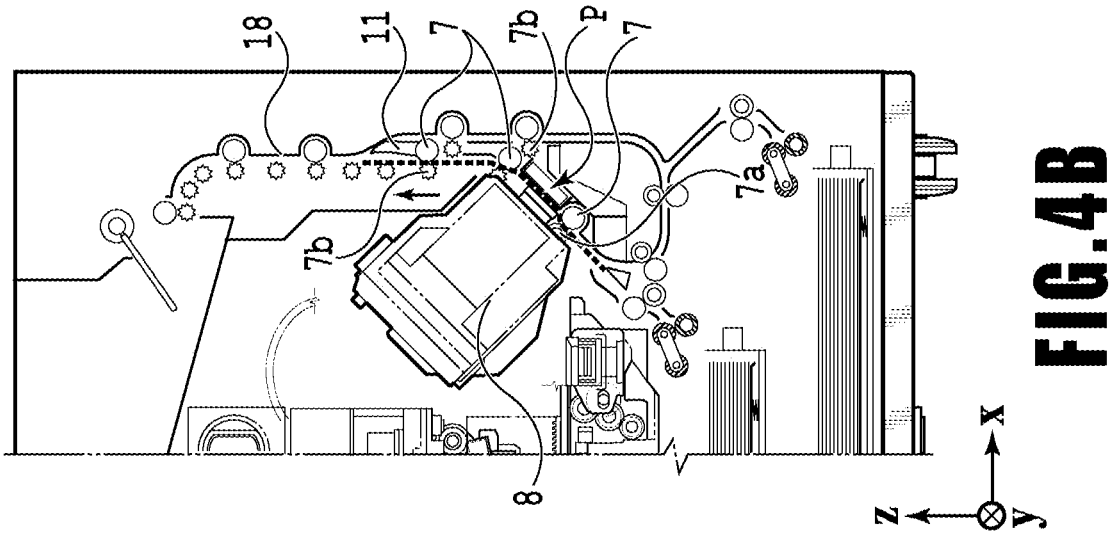
FIG. 4B shows the conveying path in the case of feeding a print medium.
Figure 4A:
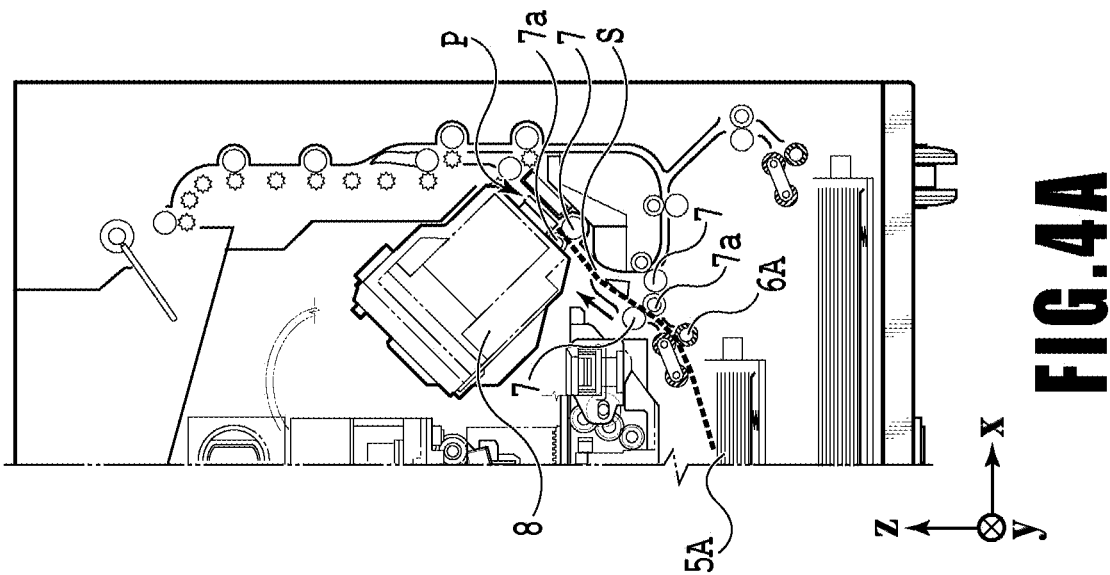
FIG. 4A shows a conveying path in the case of feeding a print medium.

FIGS. 4A to 4C are diagrams showing a conveying path in the case of feeding an A4 size print medium S from the first cassette 5A. A print medium S at the top of a stack of printing medium in the first cassette 5A is separated from the rest of the stack by the first feeding unit 6A and conveyed toward a print area P between the platen 9 and the print head 8 while being nipped between the conveying rollers 7 and the pinch rollers 7a. FIG. 4A shows a conveying state where the front end of the print medium S is about to reach the print area P. The direction of movement of the print medium S is changed from the horizontal direction (x-direction) to a direction inclined about 45° with respect to the horizontal direction while being fed by the first feeding unit 6A to reach the print area P.

In the print area P, a plurality of ejection openings provided in the print head 8 eject ink toward the print medium S. In an area where ink is applied to the print medium S, the back side of the print medium S is supported by the platen 9 so as to keep a constant distance between the ejection opening surface 8a and the print medium S. After ink is applied to the print medium S, the conveying rollers 7 and the spurs 7b guide the print medium S such that the print medium S passes on the left of the flapper 11 with its tip inclined to the right and is conveyed along the guide 18 in the vertically upward direction of the printing apparatus 1. FIG. 4B shows a state where the front end of the print medium S has passed through the print area P and the print medium S is being conveyed vertically upward. The conveying rollers 7 and the spurs 7b change the direction of movement of the print medium S from the direction inclined about 45° with respect to the horizontal direction in the print area P to the vertically upward direction.

After being conveyed vertically upward, the print medium S is discharged into the discharging tray 13 by the discharging roller 12 and the spurs 7b. FIG. 4C shows a state where the front end of the print medium S has passed through the discharging roller 12 and the print medium S is being discharged into the discharging tray 13. The discharged print medium S is held in the discharging tray 13 with the side on which an image was printed by the print head 8 down.

FIGS. 5A to 5C are diagrams showing a conveying path in the case of feeding an A3 size print medium S from the second cassette 5B. A print medium S at the top of a stack of printing medium in the second cassette 5B is separated from the rest of the stack by the second feeding unit 6B and conveyed toward the print area P between the platen 9 and the print head 8 while being nipped between the conveying rollers 7 and the pinch rollers 7a.

FIG. 5A shows a conveying state where the front end of the print medium S is about to reach the print area P. In a part of the conveying path, through which the print medium S is fed by the second feeding unit 6B toward the print area P, the plurality of conveying rollers 7, the plurality of pinch rollers 7a, and the inner guide 19 are provided such that the print medium S is conveyed to the platen 9 while being bent into an S-shape.

The rest of the conveying path is the same as that in the case of the A4 size print medium S shown in FIGS. 4B and 4C. FIG. 5B shows a state where the front end of the print medium S has passed through the print area P and the print medium S is being conveyed vertically upward. FIG. 5C shows a state where the front end of the print medium S has passed through the discharging roller 12 and the print medium S is being discharged into the discharging tray 13.

FIGS. 6A to 6D show a conveying path in the case of performing print operation (duplex printing) for the back side (second side) of an A4 size print medium S. In the case of duplex printing, print operation is first performed for the first side (front side) and then performed for the second side (back side). A conveying procedure during print operation for the first side is the same as that shown in FIGS. 4A to 4C and therefore description will be omitted. A conveying procedure subsequent to FIG. 4C will be described below.

After the print head 8 finishes print operation for the first side and the back end of the print medium S passes by the flapper 11, the print controller 202 turns the conveying rollers 7 backward to convey the print medium S into the printing apparatus 1. At this time, since the flapper 11 is controlled by an actuator (not shown) such that the tip of the flapper 11 is inclined to the left, the front end of the print medium S (corresponding to the back end during the print operation for the first side) passes on the right of the flapper 11 and is conveyed vertically downward. FIG. 6A shows a state where the front end of the print medium S (corresponding to the back end during the print operation for the first side) is passing on the right of the flapper 11.

Then, the print medium S is conveyed along the curved outer surface of the inner guide 19 and then conveyed again to the print area P between the print head 8 and the platen 9. At this time, the second side of the print medium S faces the ejection opening surface 8a of the print head 8. FIG. 6B shows a conveying state where the front end of the print medium S is about to reach the print area P for print operation for the second side.

The rest of the conveying path is the same as that in the case of the print operation for the first side shown in FIGS. 4B and 4C. FIG. 6C shows a state where the front end of the print medium S has passed through the print area P and the print medium S is being conveyed vertically upward. At this time, the flapper 11 is controlled by the actuator (not shown) such that the tip of the flapper 11 is inclined to the right. FIG. 6D shows a state where the front end of the print medium S has passed through the discharging roller 12 and the print medium S is being discharged into the discharging tray 13.

Next, maintenance operation for the print head 8 will be described. As described with reference to FIG. 1, the maintenance unit 16 of the present embodiment comprises the cap unit 10 and the wiping unit 17 and activates them at predetermined timings to perform maintenance operation.

Figure 7:
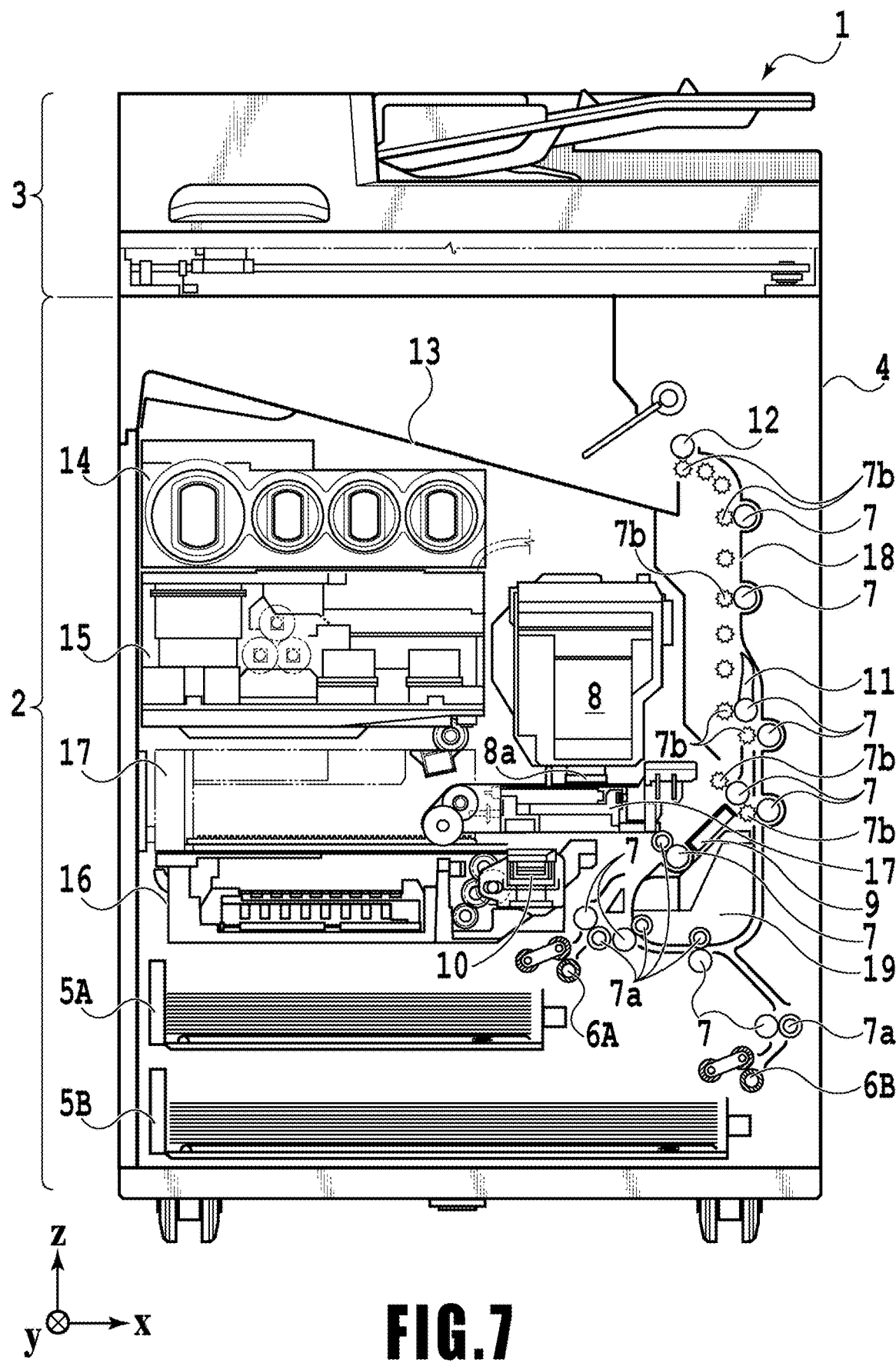
FIG. 7 shows the printing apparatus in a maintenance state.

FIG. 7 is a diagram showing the printing apparatus 1 in a maintenance state. In the case of moving the print head 8 from the standby position shown in FIG. 1 to a maintenance position shown in FIG. 7, the print controller 202 moves the print head 8 vertically upward and moves the cap unit 10 vertically downward. The print controller 202 then moves the wiping unit 17 from the evacuation position to the right in FIG. 7. After that, the print controller 202 moves the print head 8 vertically downward to the maintenance position where maintenance operation can be performed.

On the other hand, in the case of moving the print head 8 from the printing position shown in FIG. 3 to the maintenance position shown in FIG. 7, the print controller 202 moves the print head 8 vertically upward while turning it 45°. The print controller 202 then moves the wiping unit 17 from the evacuation position to the right. Following that, the print controller 202 moves the print head 8 vertically downward to the maintenance position where maintenance operation can be performed by maintenance unit 16.

In the following, characteristic components of the invention will be described.

Figure 8A:
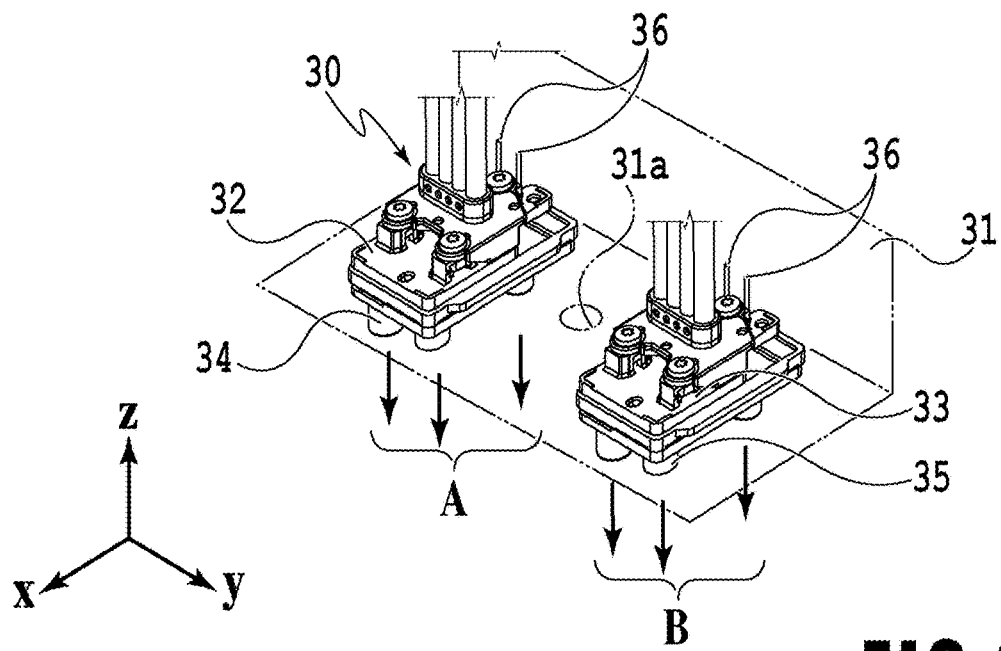
FIG. 8A shows a joint unit.
Figure 8B:
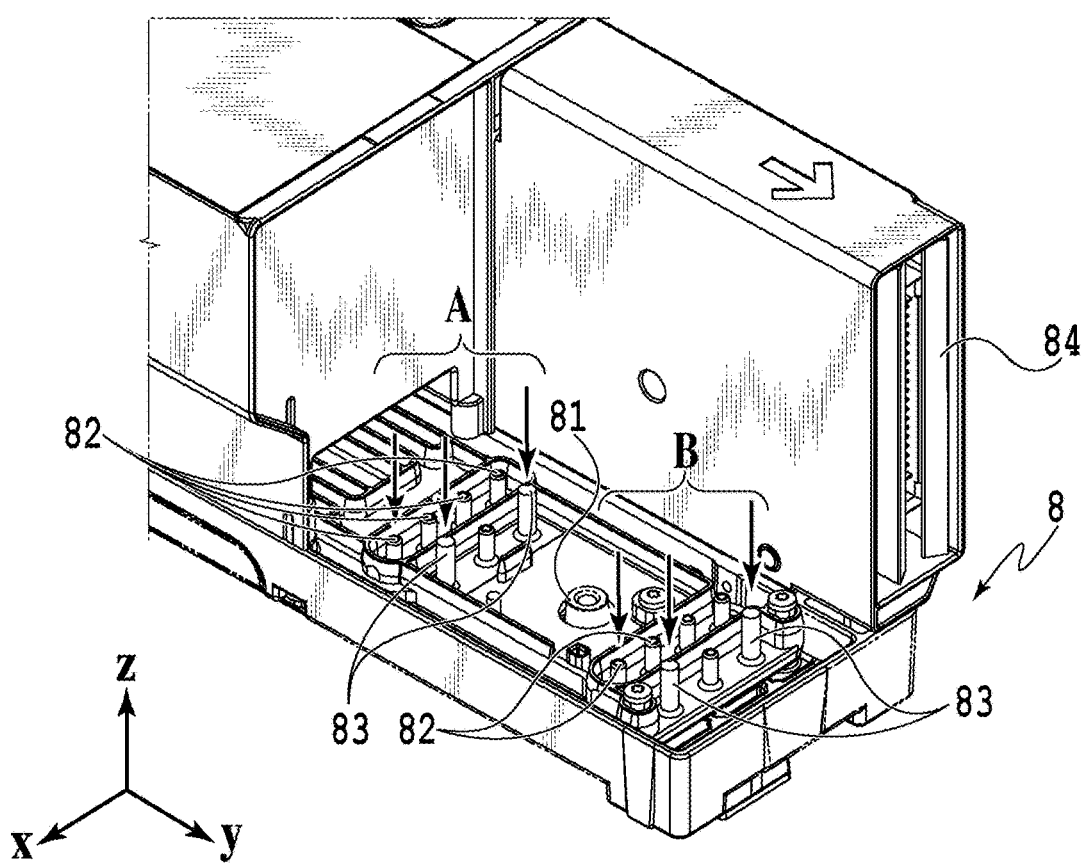
FIG. 8B shows a print head.

FIG. 8A shows a joint unit 30, and FIG. 8B shows a print head 8 connected to the joint unit 30. The joint unit 30 has a supply joint part 32 for supplying ink to the print head 8, and a collection joint part 33 for collecting ink from the print head 8, which are fixed to a holder plate 31 to be a support member.

On the other hand, the print head 8 has provided therein a head joint (referred to as needle, in the following) 82 for receiving and supplying ink, and a positioning pin 83. Both the needle 82 connected to the supply joint part 32 and the needle 82 connected to the collection joint part 33 are prepared for the four colors of cyan, magenta, yellow, and black. In addition, two of the positioning pins 83 are prepared for each of the supply joint part 32 and the collection joint part 33.

The surface connecting to the print head 8 of the joint unit 30 has provided thereon a needle joint 34 at a position corresponding to the needle 82 and a pin guide 35 at a position corresponding to the positioning pin 83, respectively. Guided by insertion of the positioning pin 83 into the pin guide 35, eight of the needles 82 are respectively connected to eight of the needle joints 34. As a result, connection of the printing apparatus 1 and the print head 8 is realized. As thus described, the connection direction (z-direction) between the print head 8 and the joint unit 30 turns out to be a direction intersecting with the direction (y-direction) in which the print head 8 is attached to the printing apparatus 1.

The supply joint part 32 includes a pair of ink leakage detection pins (electrode pins) 36. The ink leakage detection pins 36 are connected to a control substrate, and allow for detecting ink leakage which has occurred at the part connecting the supply joint part 32 and the print head 8, by detecting a resistance value between the pair of ink leakage detection pins 36. The collection joint part 33 also has a pair of the ink leakage detection pins 36 provided thereon in a similar manner.

In the case of supplying ink to the print head 8, the ink is pressurized and supplied from the supply joint part 32, and therefore it is conceivable that a large amount of ink may leak out in a short time in the case where ink leakage has occurred at the supply side. However, in the case of collecting ink from the print head 8, suction collection is performed with a pump and therefore ink leakage is unlikely to occur. Therefore, it is not essential to provide the ink leakage detection pins 36 on the collection joint part 33. In the following, description will be provided focusing on the supply joint part 32, omitting explanation of the collection joint part 33 which is a common component.

Figure 9:
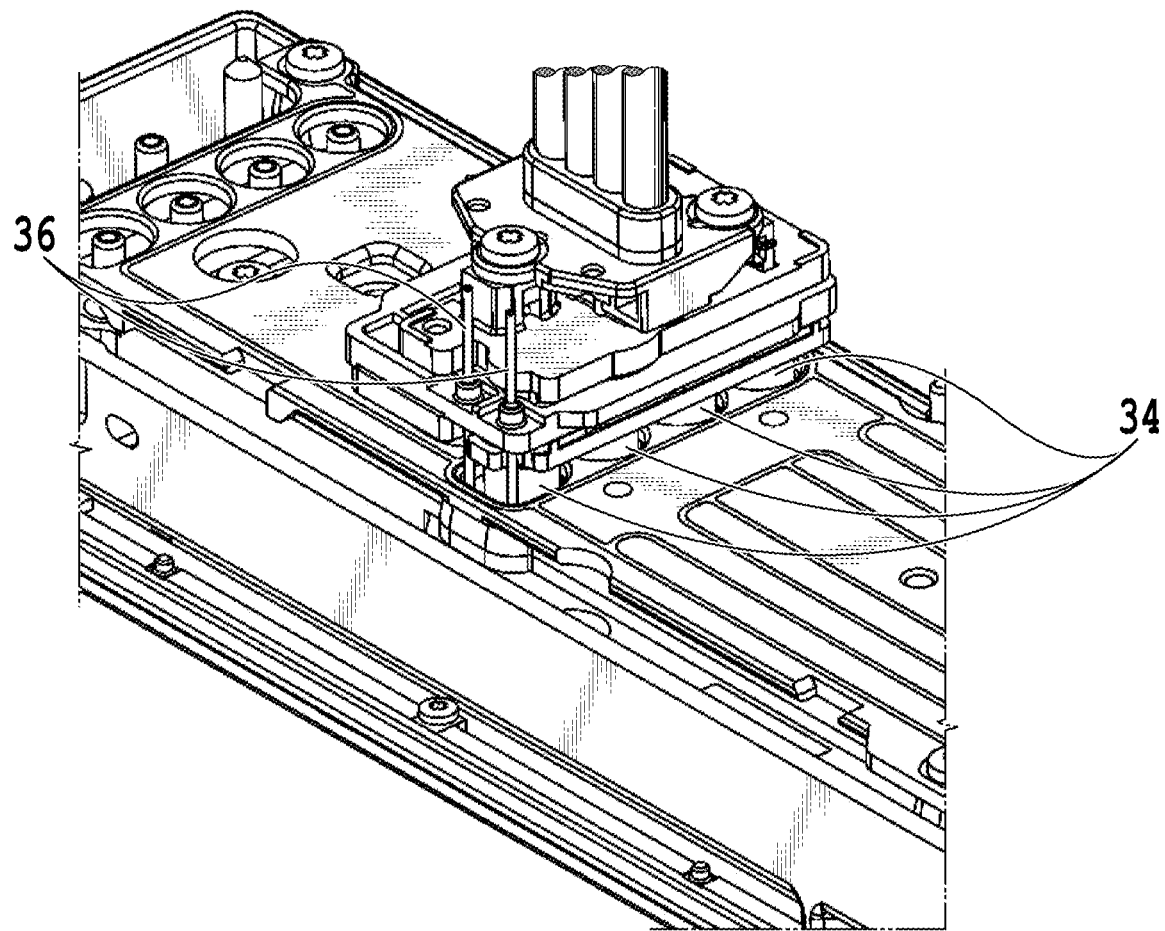
FIG. 9 shows ink leakage detection pin of a supply joint part.

FIG. 9 shows the ink leakage detection pins 36 of the supply joint part 32. The ink leakage detection pins 36 are provided in close proximity to the needle joint 34 provided at the end of the supply joint part 32. In the case where ink leakage from the needle joint 34 has occurred, existence of ink between a pair of the ink leakage detection pins 36 causes the resistance value between the ink leakage detection pins 36 to drop, whereby it is possible to detect the ink leakage.

Figure 10:
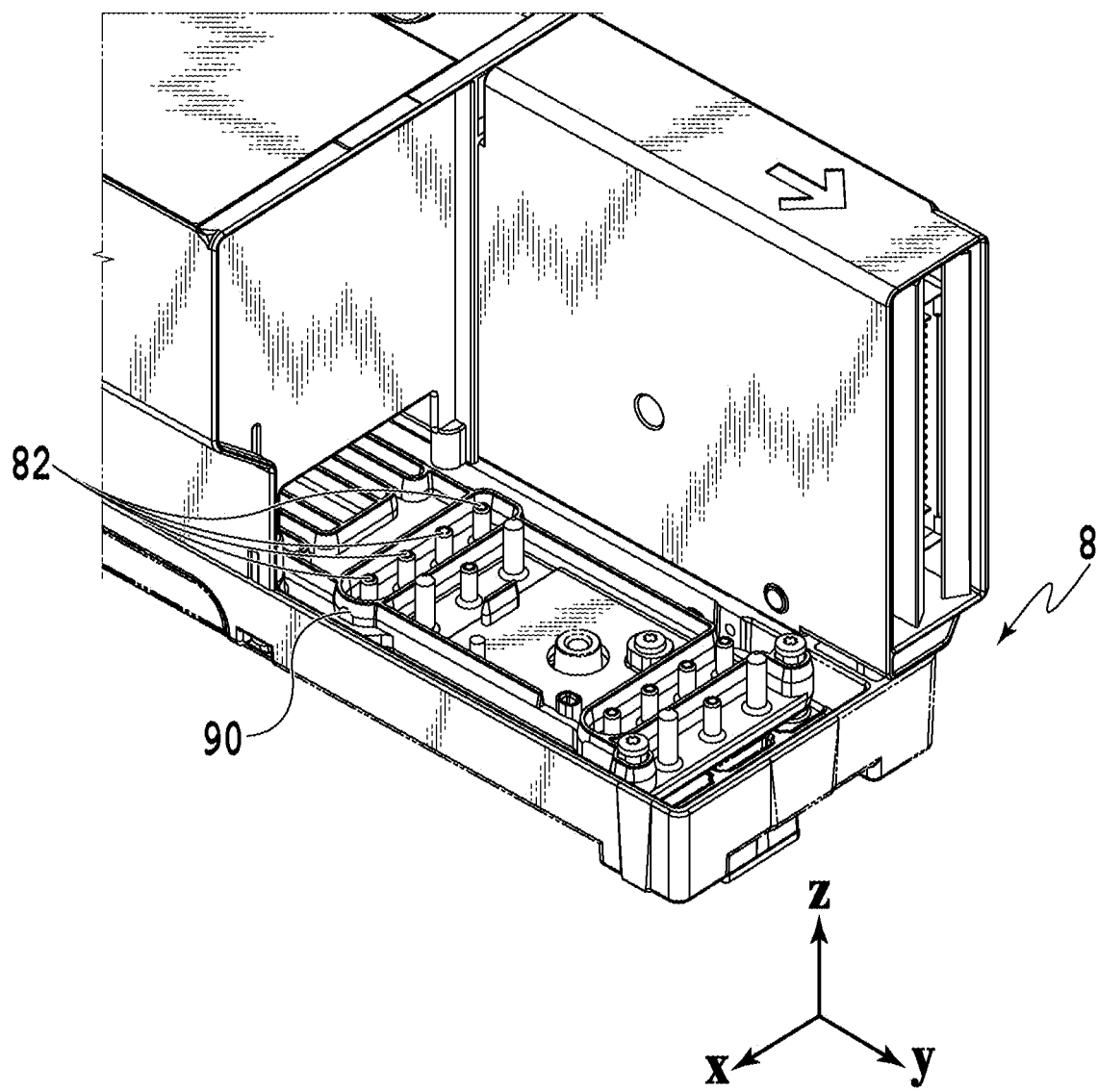
FIG. 10 shows a part connecting to the joint unit in the print head.

FIG. 10 shows a part connecting to the joint unit 30 in the print head 8. The periphery of the needle 82 connected to the supply joint part 32 has formed thereon a wall surface 90 of a predetermined height in a manner surrounding four of the needles 82. Formation of the wall surface 90 as thus described makes it difficult for the leaked ink to leak out of a range surrounded by the wall surface 90 even in the case where ink leakage has occurred at the part connecting the print head 8 and the joint unit 30 (the supply joint part 32), whereby it is possible to store a predetermined amount of the leaked ink inside the region surrounded by the wall surface 90.

The ink leakage detection pins 36 provided on the supply joint part 32 is provided to be located inside the region surrounded by the wall surface 90, in the case where the supply joint part 32 is in a connected state with the print head 8. In other words, the ink leakage detection pin 36 is capable of detecting the ink which has leaked out into the region surrounded by the wall surface 90. Since the wall surface 90 is provided so as to be surrounded by the four needles 82, the leaked ink is stored within the wall surface 90 in the case where ink leakage has occurred from any of the four needles 82, thereby allowing the ink leakage detection pins 36 to detect ink leakage early. In addition, having considered the amount of ink leakage, the detection ability of the ink leakage detection pin 36 may be enhanced by making the area of the region surrounded by the wall surface 90 as small as possible.

Figure 11:
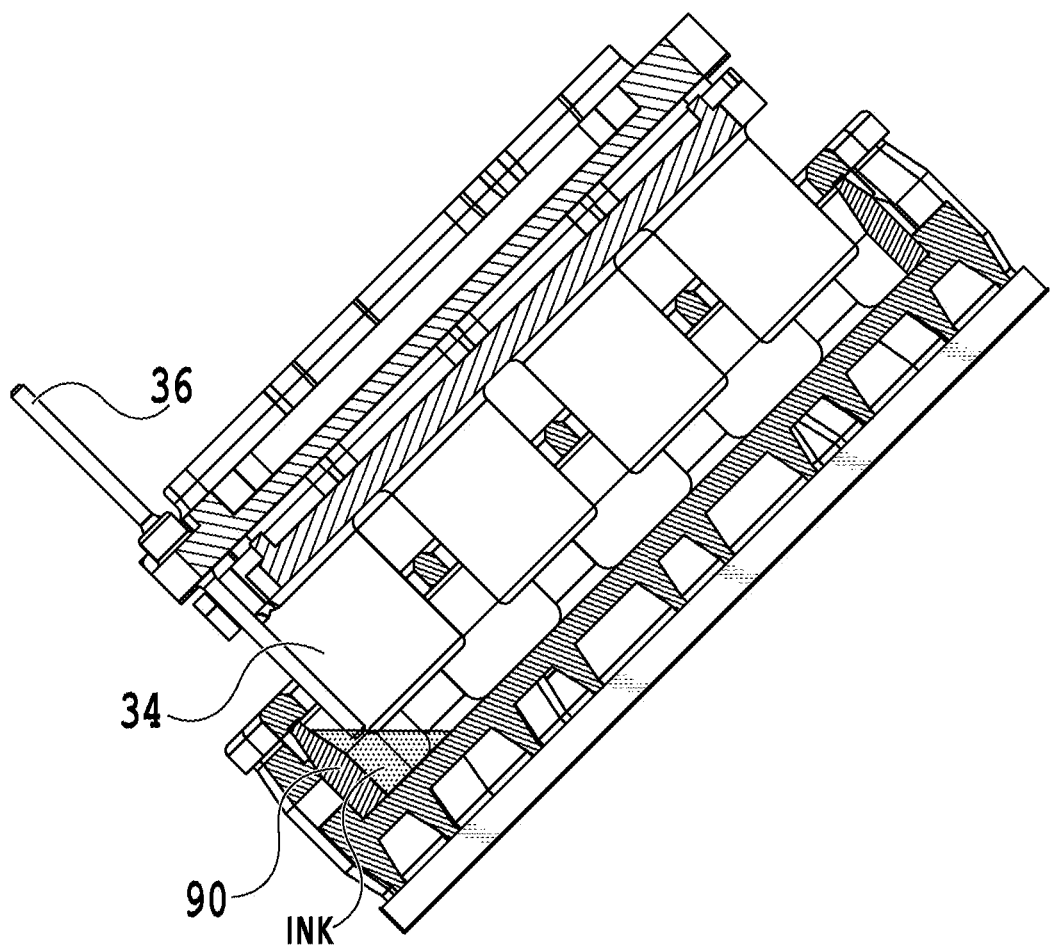
FIG. 11 shows a part connecting to the joint unit of the print head at the time of printing.

FIG. 11 shows a part connecting to the joint unit 30 in the print head 8 during print operation. As has been described above, the print head 8 in the printing apparatus 1 is inclined about 45 degrees with respect to the horizontal plane during print operation. The wall surface 90 has a predetermined height so as to be capable of detecting ink leakage, even in a state in which the print head 8 is inclined during print operation, and furthermore the ink leakage detection pins 36 are provided at an end that turns out to be the lower side in the case where the print head 8 is inclined. In other words, the ink leakage detection pins 36 are provided at an end on the lower side in the space surrounded by the wall surface 90 in which ink is stored, in the case where ink has leaked out as shown in FIG. 11. Providing the wall surface 90 and the ink leakage detection pins 36 as thus described allows for early detection of ink leakage in the case where ink leakage has occurred, even in a state in which the print head 8 is turned 45 degrees during print operation.

Figure 12:
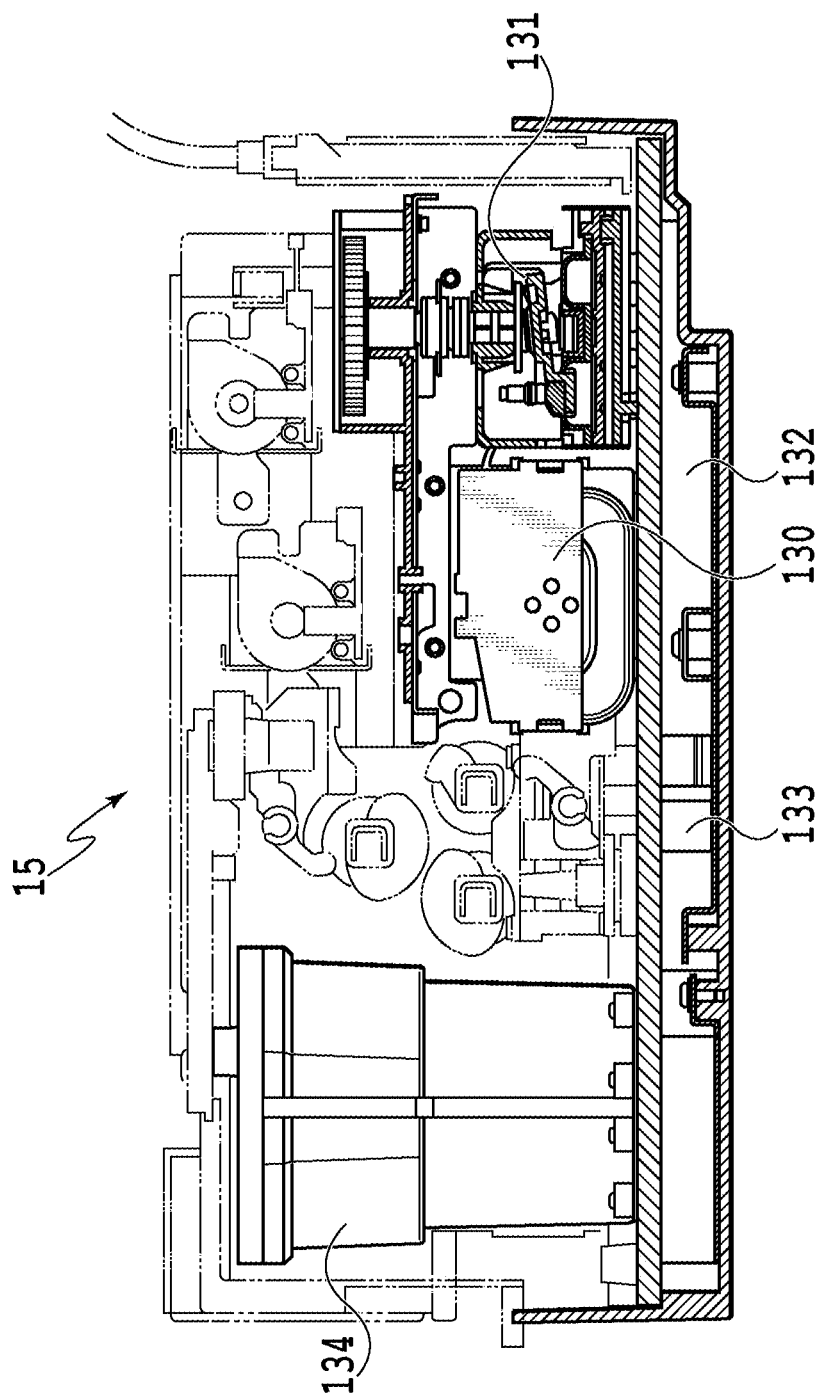
FIG. 12 is a cross-sectional view showing an ink supply unit.

FIG. 12 is a cross-sectional view showing an ink supply unit 15. The ink supply unit 15, provided between an ink tank unit 14 and the print head 8, and, wherein a supply pump 130 for supplying ink to the print head 8 and a collection pump 131 for collecting ink from the print head 8, adjusts the pressure and the flow amount of ink in the print head 8 within an appropriate range. The present embodiment adopts a circulation type ink supply system, in which the ink supply unit 15 adjusts the pressure of ink supplied from a sub tank 134 to the print head 8 and the flow amount of ink collected from the print head 8 to the sub tank 134 within an appropriate range. In addition, the ink supply unit 15 includes a plurality of valves between the print head 8 and the sub tank 134, includes a supply valve capable of opening and closing the supply flow path, and a pressure release valve capable of opening a relief valve or releasing pressure at the upstream of the print head 8, and includes a collection valve at the downstream of the print head 8. Pressure and flow of ink in the circulation flow path are controlled by opening and closing the plurality of valves. With regard to the number of the ink supply units 15, there is provided one for each of the four ink colors, so that the printing apparatus 1 includes four of them.

Ink is pressurized and supplied from the ink supply unit 15 to the print head 8 via the supply joint part 32, as has been described above. Since the pressurization for supplying ink is performed by the supply pump 130, the pressure of ink rises at the time of supply in the flow path, at the supply pump 130 downstream of the supply pump 130 in the ink supply unit 15. Therefore, there is a risk that ink leakage may occur also in the flow path of the ink supply unit 15 and it is conceivable that, in the case where ink leakage has occurred, a large amount of ink may leak out from the flow path in a short time.

Therefore, the ink supply unit 15 has an ink receiving part 132 provided at the bottom thereof, the ink receiving part 132 being capable of receiving ink which has leaked out from the flow path of the ink supply unit 15. In addition, ink receiving unit 132 has an ink leakage detection sensor 133 provided thereto.

Figure 13:
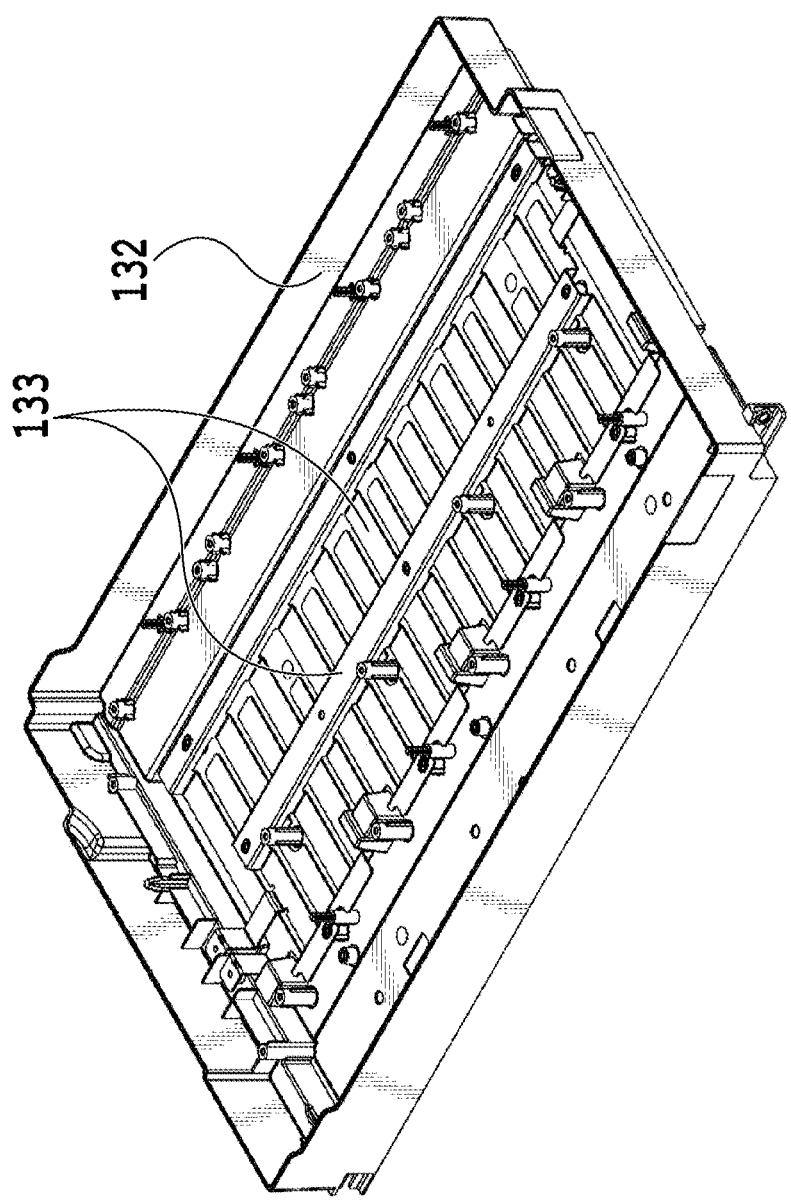
FIG. 13 is a perspective view showing an ink receiving part and an ink leakage detection sensor.

FIG. 13 is a perspective view showing the ink receiving part 132 and the ink leakage detection sensor 133. The ink leakage detection sensor 133 has a plurality of pectinate metal plates alternately arranged therein, and detecting a resistance value between the pectinate metal plates allows for detecting ink leakage which has occurred in the ink supply unit 15. The ink leakage detection sensor 133, covering generally all the portions of the ink receiving part 132 capable of receiving ink as shown, is capable of detecting ink leakage early, in the case where ink leakage has occurred in any portion. Note that the ink leakage detection sensor 133 is not limited to the configuration combining a plurality of pectinate metal plates, and there may be another configuration that covers a portion being concerned of ink leakage by corrugating a pair of metal plates to cover the plane.

In the present embodiment as thus described, it is possible to detect ink leakage early by ink leakage detection pins 36 included in the supply joint part 32, or the ink leakage detection sensor 133 included in the ink receiving part 132.

Figure 14:
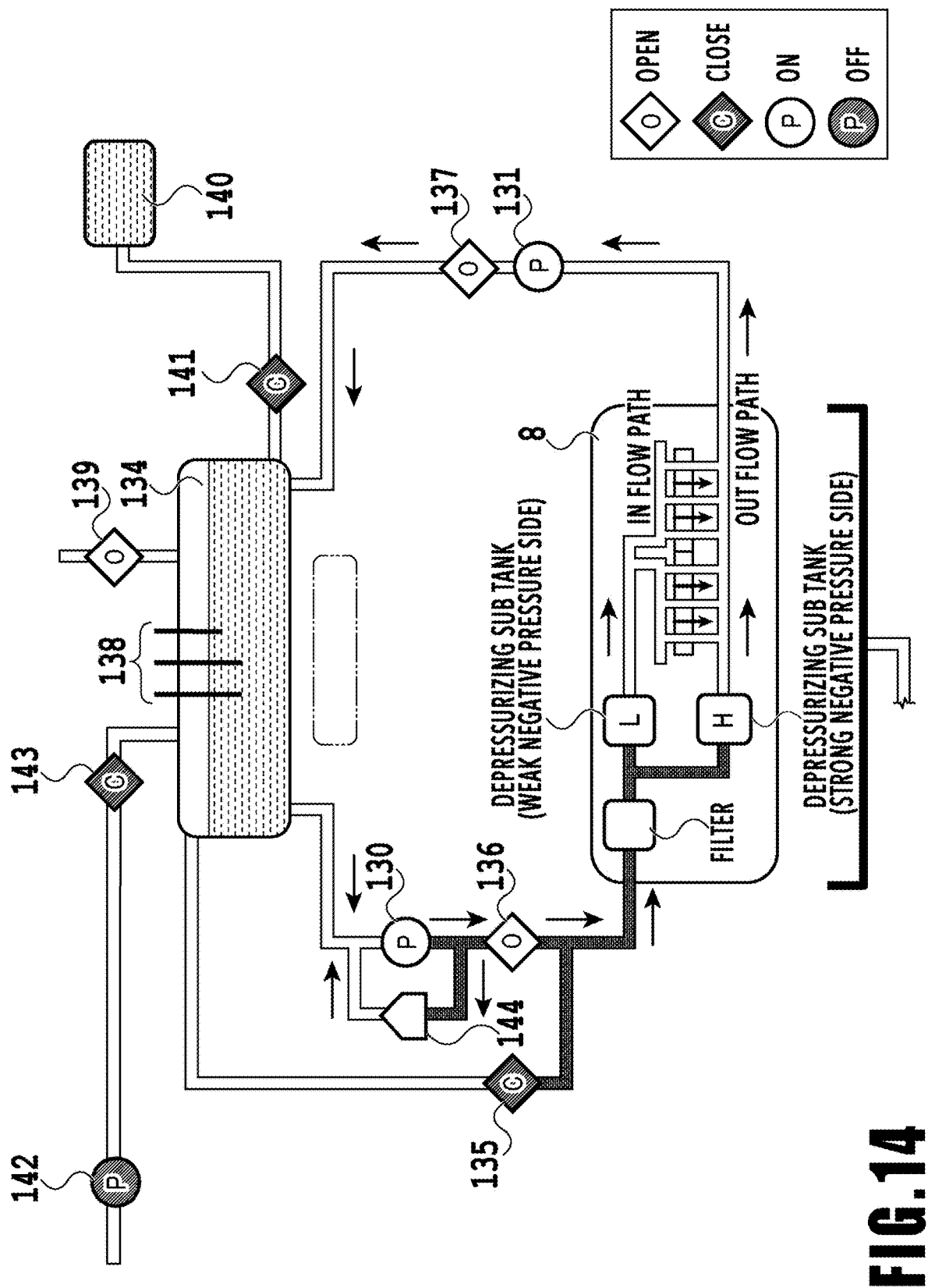
FIG. 14 shows an ink circulation system in the printing apparatus during print operation.

FIG. 14 shows an ink circulation system in the printing apparatus 1 during print operation. The ink circulation system in the printing apparatus 1 is configured so that ink circulates between the sub tank 134 and the print head 8. The sub tank 134 has provided therein a residual amount detection pin 138 configured to detect the residual amount of ink, and an atmosphere opening valve 139 configured to open the inside of the tank to the atmosphere. In addition, the sub tank 134 is connected to a main tank 140, with a tank supply valve 141 being provided between the main tank 140 and the sub tank 134. Furthermore, the sub tank 134, which has connected thereto a pipe having a depressurizing pump 142 and deairing-and-depressurizing valve 143 provided thereto, is capable of deairing or depressurizing the interior of the sub tank 134 using the depressurizing pump 142 and the deairing-and-depressurizing valve 143.

Between the sub tank 134 and the print head 8, there are provided: the supply pump 130, a supply valve 136, a pressure release valve 135, and a relief valve 144 at the upstream of the print head 8; and the collection pump 131 and a collection valve 137 at the downstream of the print head 8. During print operation, the pressure release valve 135 at the upstream is in a closed state, and operating both the supply pump 130 and the collection pump 131 causes ink to flow and circulate in the direction indicated by the arrow in the drawing. In addition, the supply valve 136 and the collection valve 137 are in an open state. Causing ink to circulate between the sub tank 134 and the print head 8 in the aforementioned state during print operation causes the ink to be pressurized in the flow path in the shaded portion of the drawing.

Figure 15A:
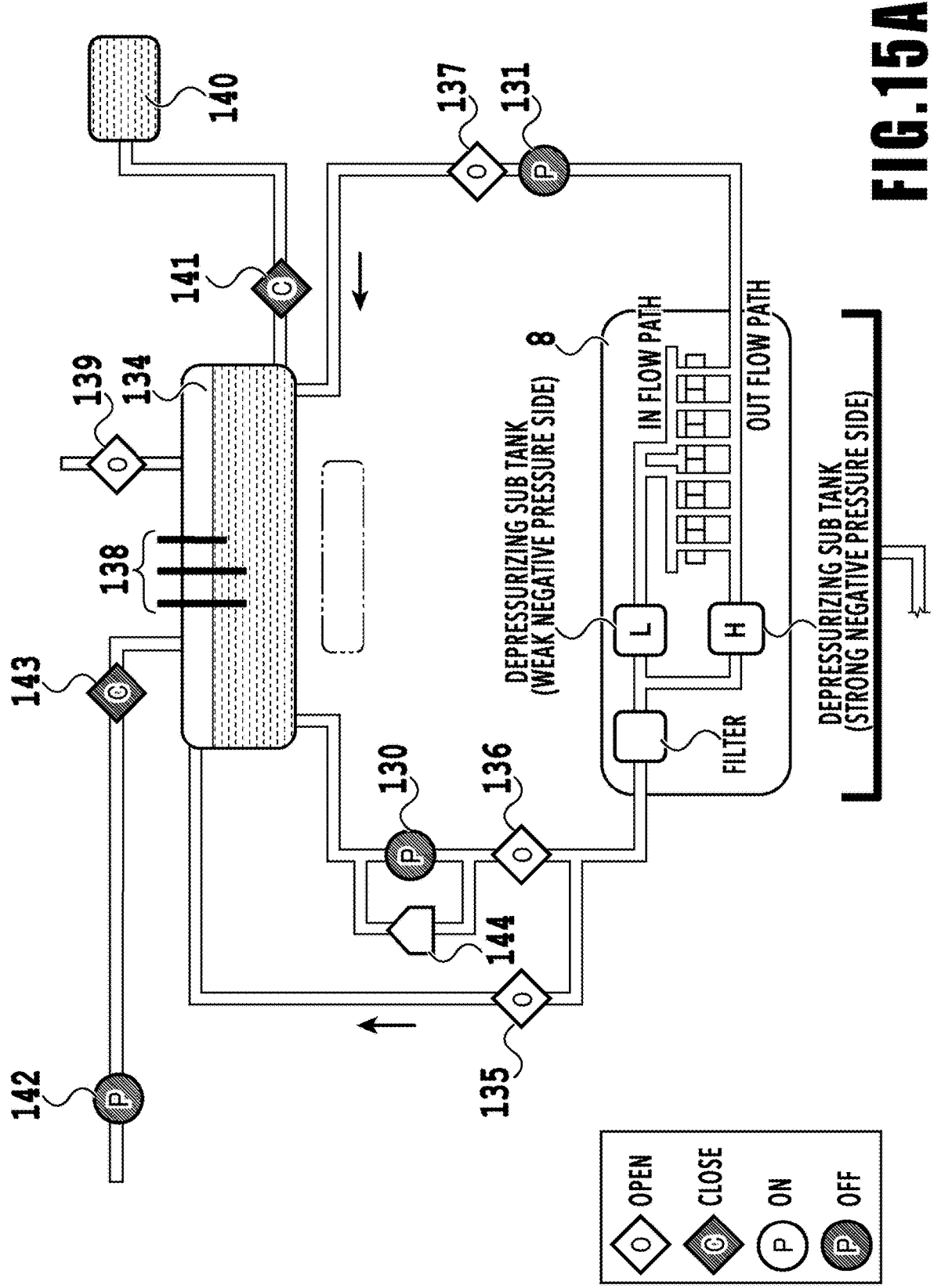
FIG. 15A shows an ink circulation system in the case where ink leakage has occurred during print operation.
Figure 15B:
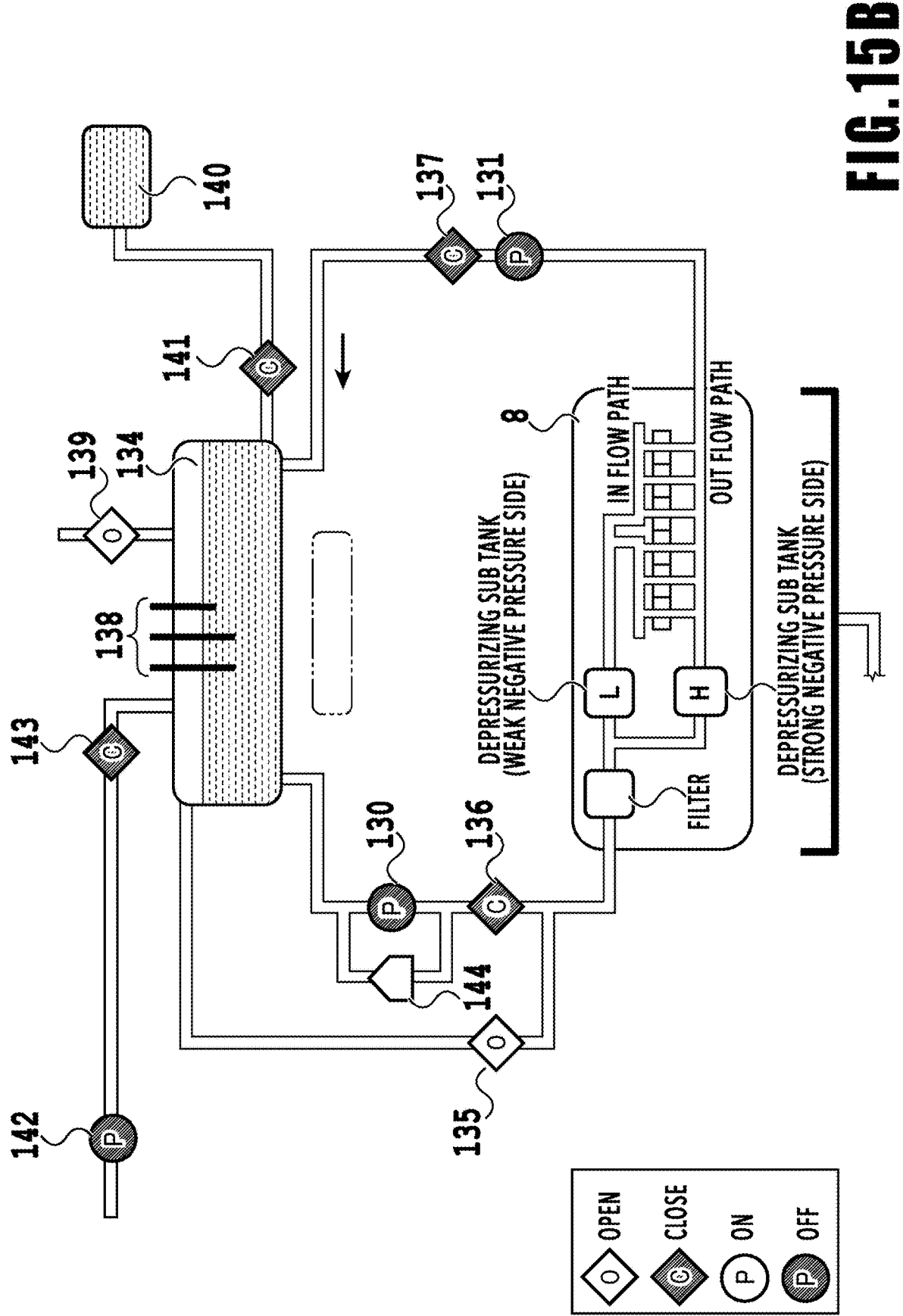
FIG. 15B shows a ink circulation system in the case where ink leakage has occurred during print operation.

FIGS. 15A and 15B show the ink circulation system in the case where ink leakage has occurred during print operation. In the case where ink leakage has occurred and is detected during print operation, operation of the supply pump 130 and the collection pump 131 is first terminated, the pressure release valve 135 is then opened, thereby releasing the pressure of the pressurized ink (see FIG. 15A). Subsequently, as shown in FIG. 15B, supply of ink to the print head 8 is interrupted by closing the supply valve 136 and the collection valve 137, thereby preventing further leakage of ink in the part where ink leakage has occurred.

Figure 16:
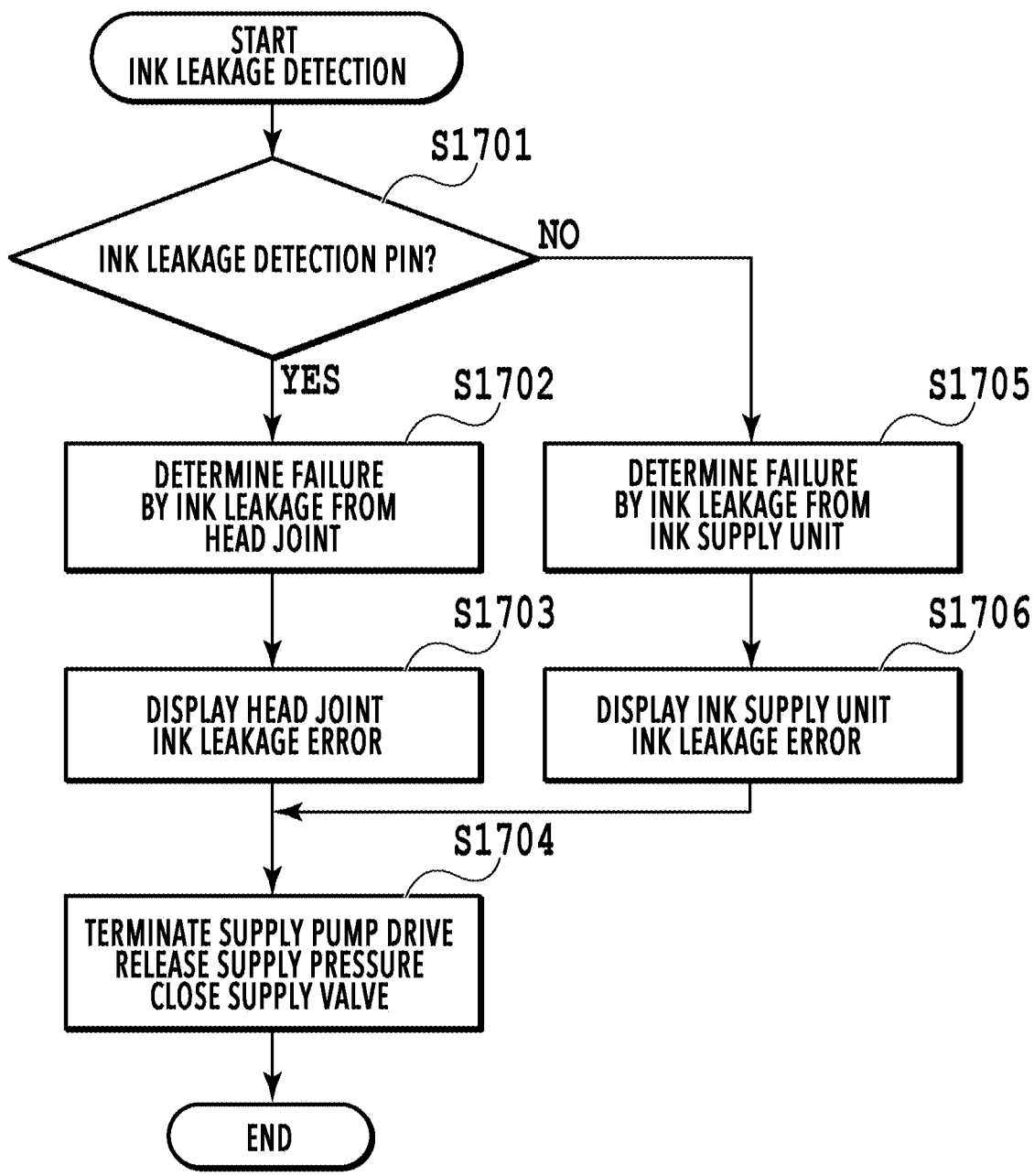
FIG. 16 is a flowchart showing ink leakage detection process.

FIG. 16 is a flowchart showing an ink leakage detection process in the present embodiment. In the following, the ink leakage detection process of the present embodiment will be described using the flowchart. In the case where ink leakage has occurred and the ink leakage detection process is started, it is determined at S1701 whether or not it is the ink leakage detection pin 36 that has detected the ink leakage. In the case where the ink leakage detection pin 36 has detected the ink leakage, the process flow proceeds to S1702 at which it is determined that the ink leakage is from the supply joint part 32, and a joint part ink leakage error is displayed at S1703. Subsequently, at S1704, operation of the supply pump 130 and the collection pump 131 is terminated and the pressure release valve 135 is opened. Eventually, the supply valve 136 and the collection valve 137 are closed and the process is completed.

In the case where it is not the ink leakage detection pin 36 that has detected ink leakage at S1701, the process flow proceeds to S1705 at which it is determined that the ink leakage is from the ink supply unit 15, and an ink supply unit ink leakage error is displayed at S1706. Subsequently, at S1704, operation of the supply pump 130 and the collection pump 131 is terminated and the pressure release valve 135 is opened. Consequently, the supply valve 136 and the collection valve 137 are closed and the process is completed.

As has been described above, an ink leakage detection pin and a wall surface capable of storing leaked ink are provided at a joint part which is the part connecting the print head 8 and the ink supply unit 15. Thereby, it is possible to realize an ink-jet printing apparatus capable of detecting ink leakage early.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-068369, filed Mar. 30, 2018, which is hereby incorporated by reference wherein in its entirety.

What is claimed is:

1. A liquid ejection apparatus comprising:
   a tank configured to store liquid to be supplied to an ejection head configured to eject liquid;
   a supply flow path for supplying liquid from the tank to the ejection head;
   a connecting unit configured to connect the supply flow path to the ejection head;
   a first detection unit capable of detecting liquid which has leaked at a connecting part between the connecting unit and the ejection head; and
   a wall configured to surround the connecting part,
   wherein the first detection unit is located inside a region surrounded by the wall in a state in which the connecting unit and the ejection head are connected.

2. The liquid ejection apparatus according to claim 1, wherein the first detection unit is a pair of electrode pins.

3. The liquid ejection apparatus according to claim 2, wherein the pair of electrode pins are provided in the connecting unit.

4. The liquid ejection apparatus according to claim 1, wherein the first detection unit is provided at a lower position inside the region, in a state where an ejection opening surface of the ejection head is inclined with respect to the horizontal plane.

5. The liquid ejection apparatus according to claim 4, wherein the ejection opening surface is inclined with respect to the horizontal plane in a case where the ejection head ejects liquid to perform printing operation.

6. The liquid ejection apparatus according to claim 1, further comprising a first pressurizing unit configured to pressurize liquid from the tank to the ejection head via the connecting unit; and
   a receiving unit capable of receiving liquid which has leaked from the first pressurizing unit or from the supply flow path.

7. The liquid ejection apparatus according to claim 6, further comprising a second detection unit capable of detecting liquid received by the receiving unit.

8. The liquid ejection apparatus according to claim 7, wherein the second detection unit has a plurality of comb-shaped metal plates alternately arranged.

9. The liquid ejection apparatus according to claim 1, further comprising:
   a first pressurizing unit provided in the supply flow path and configured to pressurize liquid to be supplied to the ejection head via the connecting unit;
   a first valve capable of opening and closing the supply flow path; and
   a second valve provided in a flow path connecting a region in the supply flow path between the ejection head and the first pressurizing unit to the tank,
   wherein in a case where the first detection unit detects the liquid, the first pressurizing unit is terminated, the second valve is opened and subsequently, the first valve is closed.

10. The liquid ejection apparatus according to claim 9, further comprising
    a receiving unit capable of receiving liquid which has leaked from the first pressurizing unit or the supply flow path; and
    a second detection unit capable of detecting liquid received by the receiving unit,
    wherein in a case where at least one of the first detection unit and the second detection unit detects liquid, the first pressurizing unit is terminated, the second valve is opened and subsequently, the first valve is closed.

11. The liquid ejection apparatus according to claim 10, further comprising:
    a collection flow path for collecting liquid from the ejection head;
    a second pressurizing unit provided in the collection flow path and configured to pressurize liquid from the ejection head to the tank; and
    a third valve capable of opening and closing the collection flow path,
    wherein liquid is circulated between the ejection head and the tank by the first pressurizing unit and the second pressurizing unit.

12. The liquid ejection apparatus according to claim 11, wherein in a case where at least one of the first detection unit and the second detection unit detects liquid, the first pressurizing unit and the second pressurizing unit are terminated, the second valve is opened and subsequently, the first valve and the third valve are closed.

13. The liquid ejection apparatus according to claim 6, wherein the receiving unit is located under the supply flow path and the first pressurizing unit in a direction of gravity.

14. A liquid ejection apparatus comprising:
    a tank configured to store liquid to be supplied to an ejection head configured to eject liquid;
    a supply flow path for supplying liquid from the tank to the ejection head;
    a receiving unit capable of receiving liquid which has leaked from the supply flow path; and
    a detection unit capable of detecting liquid received by the receiving unit.

15. The liquid ejection apparatus according to claim 14, wherein the detection unit has a plurality of comb-shaped metal plates alternately arranged.

16. The liquid ejection apparatus according to claim 14, further comprising:

a first pressurizing unit provided in the supply flow path and configured to pressurize liquid from the tank to the ejection head;

a first valve capable of opening and closing the supply flow path; and a second valve provided in a flow path connecting a region in the supply flow path between the ejection head and the first pressurizing unit to the tank, wherein in a case where the detection unit detects the liquid, the first pressurizing unit is terminated, the second valve is opened and subsequently, the first valve is closed.

17. The liquid ejection apparatus according to claim 16, further comprising:

a collection flow path for collecting liquid from the ejection head;

a second pressurizing unit provided in the collection flow path and configured to pressurize liquid from the ejection head to the tank; and a third valve capable of opening and closing the collection flow path, wherein liquid is circulated between the ejection head and the tank by the first pressurizing unit and the second pressurizing unit.

* * * * *